United States Patent
Deighton et al.

(10) Patent No.: US 11,292,279 B2
(45) Date of Patent: *Apr. 5, 2022

(54) WATER-BASED INKS FOR SHRINK AND NON-SHRINK POLYMERIC FILMS

(71) Applicant: SUN CHEMICAL CORPORATION, Parsippany, NJ (US)

(72) Inventors: Rob Deighton, Halifax (GB); Peter Salthouse, Knutsford (GB); Gary Butler, Huddersfield (GB)

(73) Assignee: Sun Chemical Corporation, Parsippany, NJ (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/339,943

(22) PCT Filed: Oct. 17, 2017

(86) PCT No.: PCT/US2017/056938
§ 371 (c)(1),
(2) Date: Apr. 5, 2019

(87) PCT Pub. No.: WO2018/075487
PCT Pub. Date: Apr. 26, 2018

(65) Prior Publication Data
US 2020/0047532 A1    Feb. 13, 2020

Related U.S. Application Data

(60) Provisional application No. 62/410,437, filed on Oct. 20, 2016.

(51) Int. Cl.
| | |
|---|---|
| B41M 5/00 | (2006.01) |
| C09D 5/02 | (2006.01) |
| C09D 10/00 | (2006.01) |
| C09D 11/023 | (2014.01) |
| C09D 11/10 | (2014.01) |
| C09D 133/08 | (2006.01) |
| C09D 183/06 | (2006.01) |

(52) U.S. Cl.
CPC ........... *B41M 5/0064* (2013.01); *C09D 5/024* (2013.01); *C09D 10/00* (2013.01); *C09D 11/023* (2013.01); *C09D 11/10* (2013.01); *C09D 133/08* (2013.01); *C09D 183/06* (2013.01)

(58) Field of Classification Search
None
See application file for complete search history.

(56) References Cited

U.S. PATENT DOCUMENTS

| | | | |
|---|---|---|---|
| 7,807,739 B2 | 10/2010 | Obst et al. | |
| 10,113,077 B2 * | 10/2018 | Deighton | C09D 11/03 |
| 10,570,299 B2 * | 2/2020 | Deighton | C09D 11/107 |
| 2005/0070628 A1 * | 3/2005 | Menoud | C09D 11/102 |
| | | | 523/160 |
| 2006/0127649 A1 * | 6/2006 | Keller | B42D 25/333 |
| | | | 428/195.1 |
| 2006/0128831 A1 * | 6/2006 | Cook | C09J 133/04 |
| | | | 523/160 |
| 2006/0246243 A1 | 11/2006 | Eugene et al. | |
| 2006/0256176 A1 | 11/2006 | Prasad et al. | |
| 2009/0088498 A1 | 4/2009 | Simpson, Sr. | |
| 2009/0029776 A1 | 12/2009 | Menoud et al. | |
| 2010/0212830 A1 | 8/2010 | Stumbeck et al. | |
| 2010/0283007 A1 * | 11/2010 | Robinson | C09K 11/06 |
| | | | 252/301.36 |
| 2013/0309516 A1 | 11/2013 | Yokoyama et al. | |
| 2015/0017459 A1 | 1/2015 | Nabuurs et al. | |
| 2016/0200942 A1 | 7/2016 | Schottland et al. | |

FOREIGN PATENT DOCUMENTS

| | | |
|---|---|---|
| CN | 101812255 A | 8/2010 |
| EP | 1493762 B1 | 5/2007 |
| JP | 4-225081 A | 8/1992 |
| JP | 3301267 B2 | 4/2002 |
| JP | 2004-238578 A | 8/2004 |
| JP | 2011-148302 A | 8/2011 |
| JP | 2011-153172 A | 8/2011 |
| WO | WO 01/36547 A1 | 5/2001 |
| WO | WO 2005/005507 | 1/2005 |
| WO | WO 2015/165553 A1 | 11/2015 |
| WO | WO 2016/028850 A1 | 2/2016 |

OTHER PUBLICATIONS

BYK-024 Data Sheet; May 2014.*
Supplementary European Search Report issued in counterpart EP Application No. EP 17 86 1423 dated Apr. 29, 2020.
Chinese Office Action issued in counterpart Chinese Application No. 201780061712.6 dated Jan. 21, 2021.
PCT International Preliminary Report on Patentability issued in PCT/US2017/056938 dated Apr. 23, 2019.
PCT International Search Report issued in PCT/US2017/056938 dated Jan. 8, 2018.
Written Opinion of the International Searching Authority issued in PCT/US2017/056938 dated Jan. 8, 2018.
Dow® (2017-2020) Technical Data Sheet, Dowsil™ 65-Additive. The Dow Chemical Company. Form No. 25-302-01-0820 S2D.
AB (Jun. 2020) "Specialty-Silicones Raw Materials." AB Special Silicones. Raw Material Solutions. Www.andisil.com.
Shin Etsu (2010) "Defoaming Agents." Shin Etsu Chemical Co., Ltd., http://www.shinetsusilicone-global.com/.
SpecialChem Universal Selector (Jan. 4, 2021) "Dowsil™ 84 Additive Technical Data Sheet suppled by Dow." Http://coatings.Specialchem.com.

(Continued)

*Primary Examiner* — James M Mellott
(74) *Attorney, Agent, or Firm* — Marian E. Fundytus; Ostrolenk Faber LLP.

(57) ABSTRACT

The present invention provides a process for preparing printed shrinkable polymeric film substrates, by applying an ink or overprint varnish comprising self-crosslinking acrylic emulsions. The inks and overprint varnishes are rub, scratch, chemical, humidity/water, and heat resistant, as well as being resistant to repeated bending and folding.

20 Claims, No Drawings

(56) References Cited

OTHER PUBLICATIONS

AMSI USA (Dec. 15, 2020) "How Do Antifoaming Agents Work." AMS Applied Material Solutions, https://www.applia:lmaterialsolulirons.com/how-do-ardifoaming-agents-work/.
SNF Floerger® Flofoam™ Defoamer. https://www.snf.com/snf-marketing-materials/flofoam-defoamer/.
Momentive (May 4, 2017) SAG 10 Foam Control Agent Safety Data Sheet. https://sds.momentive.com/ehswww/testEbiz/e/result/result.jsp.
Japanese Office Action issued in counterpart Japanese Application No. 2019-520436 dated Sep. 24, 2021 with English language translation thereof.

* cited by examiner

WATER-BASED INKS FOR SHRINK AND NON-SHRINK POLYMERIC FILMS

CROSS REFERENCE TO RELATED APPLICATIONS

The present application is a § 371 National Stage application based on PCT/US2017/056938 filed Oct. 17, 2017, which claims the benefit of U.S. Provisional Application No. 62/410,437, filed Oct. 20, 2016, the subject matter of each of which is incorporated by reference in their entirety.

FIELD OF THE INVENTION

The present invention is related to water-based ink and coating compositions, including overprint varnishes. The compositions are particularly suitable for printing on shrinkable polymeric films, such as films used for shrink-wrap labels on food and pharmaceutical packaging. In some instances, the compositions can also be printed on polymeric films that are not shrinkable.

BACKGROUND

Inks and coatings for shrink polymeric films are typically solvent-based. However, there are problems associated with solvent-based inks and coatings. For example, the solvents are generally volatile, and for safety and environmental reasons, volatile solvents are falling out of favor. Moreover, volatile solvent remaining in the dried ink or coating often migrates out of the ink or coating, and, when the substrate is used for packaging, such as for food or pharmaceuticals, causes contamination of the product.

Currently available water-based inks for printing on shrinkable polymeric films, and other polymeric films, generally comprise polyurethane resins, acrylic resins, cellulosic resins, and/or epoxy ester resins. Many of the currently available inks contain bisphenol-A (BPA), which has been found to be toxic.

WO 2016/028850 discloses water-based inks and coatings comprising self-crosslinking acrylic polymers. The inks and coatings are suitable for printing on coated and uncoated paper and paperboard substrates, such as used in food packaging.

EP 1493762 discloses polyurethane resins useful as binders in inks for printing shrink sleeves. Also disclosed are inks comprising the polyurethane resins, and methods of preparing and using the polyurethane resins.

JP 2004-238578 describes inks comprising polyurethane and cellulosic resins, and which inks are suitable for printing on shrink label olefinic films.

JP 2011-148302 discloses shrink labels that are printed on at least one surface with an ink or coating containing urethane acrylic resin and acrylic resin or containing urethane acrylic resin, acrylic resin and cellulose-based resin.

JP 2011-153172 describes printing inks for labels, wherein the inks contain cellulosic resins, acrylic resins and energy-curable monomers.

US 2006/0246243 and WO 2005/005507 disclose a polyurethane resin, and inks containing the resin that are suitable for printing on shrink sleeves.

US 2010/0212830 discloses solvent-free thermosetting compositions consisting of at least one (iso)cyanate, and a nitrogen based latent curing agent, and optionally containing epoxy resins and modifiers. The compositions are used for bonding, casting, sealing, and coating substrates, in particular electronic parts.

US 2009/0297796 discloses water-based screen printing inks that may be suitable for other printing methods, primarily containing specialist pigments and a cross linker.

U.S. Pat. No. 7,807,739 discloses an aqueous composition for coating substrates, the composition comprising cross linkable polymer, an acrylic polymer, and an epoxysilane.

US 2013/0309516 is directed to a coating composition having an acrylic polymer with a low glass transition temperature, that contains a cross linkable functional group and a cross linking agent.

JP 3301267 is directed to water color inks containing a resin for use on corrugated fiberboard.

CN 101812255 is directed to an ink containing an acrylic resin for use on a high temperature resistance carton.

JP H04-225081 discloses aqueous printing ink compositions that comprise a resin acid salt, water, a colorant, and an organic metallic chelate compound. The inks are useful for printing paper cartons.

There remains a need for water-based inks, coatings and varnishes that are suitable for printing on shrinkable polymeric films used for packaging, and that exhibit enhanced resistance properties.

SUMMARY OF THE INVENTION

The present invention provides ink and coating compositions, and overprint varnishes, containing self-crosslinking acrylic polymers, a coalescent, and at least one silicone emulsion. The ink and coating compositions are particularly suitable for printing on shrinkable polymeric films, such as films used for shrink-wrap labels. The compositions may also be used on polymeric films that are not shrinkable. The printed ink and coating compositions exhibit good adhesion and resistance properties.

In a particular aspect, the present invention provides a process for printing on a polymeric substrate, comprising:
 a) providing an ink or coating composition comprising:
  i. at least one self-crosslinking acrylic polymer;
  ii. at least one coalescent;
  iii. at least one silicone emulsion; and
  iv. water;
  v. wherein the self-crosslinking acrylic polymer has a glass transition temperature of greater than 0° C.
 b) applying the ink or coating composition of a) to a polymeric substrate; and
 c) drying the ink or coating composition on the polymeric substrate.

In another aspect, the present invention provides a printed polymeric substrate prepared by the process of the invention.

In one embodiment, the printed polymeric substrate is a shrinkable polymeric film.

In one embodiment, the present invention provides an article comprising the printed polymeric substrate prepared by the process of the present invention.

DETAILED DESCRIPTION OF THE INVENTION

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

It has now been found that inks or overprint varnishes containing a self-crosslinking acrylic polymer, a coalescent, and at least one silicone emulsion, can exhibit good adhesive properties on shrinkable polymeric films, along with the requisite resistance properties when the self-crosslinking acrylic polymer has a glass transition temperature (Tg) of greater than 0° C. Advantageously, the self-crosslinking acrylic polymer has a Tg from about 20° C. to about 70° C.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "ink and coating composition(s)," "ink(s) and overprint varnishe(s)," "overprint varnishe(s)," "ink(s)," "varnishe(s)," "coating composition(s)," "coating(s)," and the like, when referring to the present invention, all refer to compositions of the present invention.

As used herein, the term "article" or "articles" means a substrate or product of manufacture. Examples of articles include, but are not limited to: substrates such as paper, plastic, plastic or polymer film, glass, ceramic, metal, composites, and the like; and products of manufacture such as publications (e.g. brochures), labels, and packaging materials (e.g. flexible shrinkable and non-shrinkable polymeric films, and cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

Inks and Overprint Varnishes and Process for Printing on Flexible Polymeric Films Self-crosslinking polymers contain a functionality which is self-reactive, and thus do not require the use of a separate co-reactant per se. The self-crosslinking polymer is usually in the form of an aqueous dispersion or emulsion and is typically the product of at least two monomers that react with one another. For example, such a polymer may contain both a carbonyl and an amine functional group.

There are several mechanisms by which a polymer can be self-crosslinking. One mechanism is by the use of phase separated polymers, such as core-shell polymers. The shell polymer is hydrophilic, while the core polymer is hydrophobic. The hydrophilic shell maintains the dispersion, while the hydrophobic core provides the reactive sites for crosslinking.

Typically, in self-crosslinking acrylic polymer chemistry, polymers containing ketone groups crosslink at room temperature when combined with bi- or polyfunctional compounds that are reactive towards carbonyl. One example of these reactive compounds is bishydrazides. Such self-crosslinking acrylic emulsions are provided as one pack products.

The self-crosslinking reaction, depending upon the acrylic type, may also be initiated by the evaporation of water upon drying, a change of pH of the vehicle, or by curing at elevated temperatures where the cross-linking reaction occurs faster or the reactive groups are de-blocked.

One example of self-crosslinking is shown in GB-A-2045768, which describes a dispersion which is based upon the emulsion polymerization product of a monomer mixture primarily comprising lower alkyl (meth)acrylate monomers, minor amounts of (meth)acrylic acid, and glycidyl (meth) acrylate.

More recently, polymer particles with a continuous gradient morphology have been developed. With this mechanism, the ketone groups are enriched in the low Tg domains of the polymer particle. The self-crosslinking polymers are prepared by emulsion polymerization. Using the gradient morphology, little or no coalescing solvents are necessary, and minimum film forming temperatures below 5° C. are possible, while still maintaining desirable resistance properties.

Another method of preparing self-crosslinking acrylic dispersions is to perform the emulsion polymerization, but also include in the mixture an acrylic oligomer containing reactive and/or co-reactive groups. In this process, the reactive oligomer becomes grafted onto the gradient morphology core particle.

Self-crosslinking acrylic polymers may include, for example, binders selected from the group consisting of styrene-acrylic ester copolymer, a styrene/acrylic ester copolymer containing acrylamide groups, and preferably a copolymer based on acrylonitrile, methacrylamide, and acrylic ester.

Preferably, the self-crosslinking acrylic polymer is formed from reactive monomers which include at least one monomer selected from methyl acrylic acid (MAA), methyl methacrylate (MMA), butyl acrylate, butyl methacrylate, styrene, and methyl styrene. Advantageously, the self-crosslinking polymer is a styrene/acrylic ester copolymer.

In a preferred embodiment of the present invention, the self-crosslinking polymer is produced via carbonyl/amine reaction. Advantageously, an acrylate with a pendant N-methylol group, such as, for example, N-isobutoxy methylol acrylamide (NiBMA), is used. Examples of commercial acrylates formed from such monomers include, but are not limited to, Alberdingk AC2714VP, Synthomer AM00035, Organikkimyan Orgal PO86V, and DSM Neocryls XK12 and XK14.

The Tg of the acrylic polymer relates to the acrylic polymer prior to self-crosslinking. A higher Tg prevents premature gelling of the acrylic polymer. Typically, the self-crosslinking acrylic polymer has a Tg of greater than 0° C. Preferably, the self-crosslinking acrylic polymer may have a Tg between about 20° to 70° C. For example, the self-crosslinking acrylic polymer may have a Tg between about 20° C. to about 65° C.; or about 20° C. to about 60° C.; or about 20° C. to about 55° C.; or about 20° C. to about 50° C.; or about 20° C. to about 45° C.; or about 20° C. to about 40° C.; or about 20° C. to about 35° C.; or about 20° C. to about 30° C.; or about 20° C. to about 25° C.; or about 25° C. to about 70° C.; or about 25° C. to about 65° C.; or about 25° C. to about 60° C.; or about 25° C. to about 55° C.; or about 25° C. to about 50° C.; or about 25° C. to about 45° C.; or about 25° C. to about 40° C.; or about 25° C. to about 35° C.; or about 25° C. to about 30° C.; or about 30° C. to about 70° C.; or about 30° C. to about 65° C.; or about 30° C. to about 60° C.; or about 30° C. to about 55° C.; or about 30° C. to about 50° C.; or about 30° C. to about 45° C.; or about 30° C. to about 40° C.; or about 30° C. to about 35° C.; or about 35° C. to about 70° C.; or about 35° C. to about 65° C.; or about 35° C. to about 60° C.; or about 35° C. to about 55° C.; or about 35° C. to about 50° C.; or about 35° C. to about 45° C.; or about 35° C. to about 40° C.; or about 40° C. to about 70° C.; or about 40° C. to about 65° C.; or about 40° C. to about 60° C.; or about 40° C. to about 55° C.; or about 40° C. to about 50° C.; or about 40° C. to about 45° C.; or about 45° C. to about 70° C.; or about 45° C. to about 65° C.; or about 45° C. to about 60° C.; or about 45° C. to about 55° C.; or about 45° C. to about 50° C. Advantageously, the self-crosslinking acrylic polymer has a Tg between about 40° C. and 60° C.

Typically, the inks and overprint varnishes of the present invention comprise between about 15 wt % and 70 wt % of acrylic polymer (self-crosslinking+non-self-crosslinking acrylic polymers), based on the total weight of the ink or overprint varnish composition. For example, the ink or overprint varnish of the invention may comprise about 15 wt % to about 65 wt % acrylic polymer, based on the total weight of the ink or overprint varnish composition; or about 15 wt % to about 60 wt %; or about 15 wt % to about 55 wt %; or about 15 wt % to about 50 wt %; or about 15 wt % to about 45 wt %; or about 15 wt % to about 40 wt %; or about 15 wt % to about 30 wt %; or about 15 wt % to about 25 wt %; or about 15 wt % to about 20 wt %; or about 20 wt % to about 70 wt %; or about 20 wt % to about 65 wt %; or about 20 wt % to about 60 wt %; or about 20 wt % to about 55 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 70 wt %; or about 25 wt % to about 65 wt %; or about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %.

About 50 wt % to 85 wt % of the acrylic polymer is self-crosslinking, based on the total weight of the acrylic polymer (i.e. based on the total weight of [self-crosslinking]+[non-self-crosslinking]). For example, self-crosslinking acrylic polymer may be present in an amount of about 50 wt % to about 80 wt %, based on the total weight of the acrylic polymer; or about 50 wt % to about 75 wt %; or about 50 wt % to about 70 wt %; or about 50 wt % to about 65 wt %; or about 50 wt % to about 60 wt %; or about 50 wt % to about 55 wt %; or about 55 wt % to about 85 wt %; or about 55 wt % to about 80 wt %; or about 55 wt % to about 75 wt %; or about 55 wt % to about 70 wt %; or about 55 wt % to about 65 wt %; or about 55 wt % to about 60 wt %; or about 60 wt % to about 85 wt %; or about 60 wt % to about 80 wt %; or about 60 wt % to about 75 wt %; or about 60 wt % to about 70 wt %; or about 60 wt % to about 65 wt %.

The inks and varnishes of the present invention typically contain between about 5 wt % and 60 wt % self-crosslinking acrylic polymer, based on the total weight of the ink or varnish composition. For example, the ink or varnish may contain about 5 wt % to about 55 wt % self-crosslinking acrylic polymer, based on the total weight of the ink or varnish; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 60 wt %; or about 10 wt % to about 55 wt %; or about 10 wt % to about 50 wt %; or about 10 wt % to about 45 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %; or about 15 wt % to about 60 wt %; or about 15 wt % to about 55 wt %; or about 15 wt % to about 50 wt %; or about 15 wt % to about 45 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 60 wt %; or about 20 wt % to about 55 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 25 wt % to about 20 wt %.

The inks and overprint varnishes of the present invention contain a coalescent (coalescing agent). Coalescents optimize film formation. Coalescents function as temporary plasticizers for the polymer particle, and reduce the minimum film formation temperature (MFFT) of the polymer emulsion. Common coalescents include solvents such as ester alcohols, esters, and glycol ethers. Examples of such solvent coalescents include, but are not limited to, Eastman Texanol ester alcohol, Eastman EEH solvent, and Eastman DB solvent. Low Tg acrylic emulsions may also be used as coalescents. Advantageously, the coalescent used in the present invention is an acrylic emulsion, typically having a Tg of less than 20° C., preferably less than 0° C. Suitable coalescents include, but are not limited to, Dow Lucidene 605, DSM NeoCryl A-1125, NeoCryl A-2095, BASF Joncryl 8052, and BASF Joncryl ECO 2124.

Typically, the inks and overprint varnishes of the present invention comprise about 2 wt % to about 20 wt % of coalescent, based on the total weight of the ink or varnish composition, preferably between about 5 wt % and about 15 wt %. For example, the inks and overprint varnishes may comprise coalescent in an amount of about 2 wt % to about 15 wt %; or about 2 wt % to about 10 wt %; or about 2 wt % to about 5 wt %; or about 5 wt % to about 20 wt %; or about 5 wt % to about 15 wt %; or about 5 wt % to about 10 wt %.

The inks and overprint varnishes of the present invention also comprise a silicone emulsion. The addition of a silicone emulsion in the formulation helps to improve the overall resistance properties. Suitable silicone emulsions include, but are not limited to, DC 84, DC 51, and DC 209S from Dow Corning, and Worleeadd 350. These silicones are high molecular weight polydimethylsiloxane emulsions, containing reactive silanol groups. Alternatively, blocked reactive silicone emulsions may be used.

Usually, the inks and overprint varnishes of the present invention comprise about 0.2 wt % to about 3 wt % of silicone emulsion, based on the total weight of the ink or varnish composition, preferably between about 1 wt % to about 2 wt %. For example, the inks and overprint varnishes may comprise silicone emulsion in an amount of about 0.2 wt % to about 2.5 wt %; or about 0.2 wt % to about 2 wt %; or about 0.2 wt % to about 1.5 wt %; or about 0.2 wt % to about 1 wt %; or about 0.2 wt % to about 0.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %; or about 1 wt % to about 3 wt %; or about 1 wt % to about 2.5 wt %; or about 1 wt % to about 2 wt %; or about 1 wt % to about 1.5 wt %.

The inks and overprint varnishes of the present invention comprise water. Water may be added directly, or may be included in the compositions as part of an acrylic or silicone emulsion. Typically, the inks and overprint varnishes of the present invention comprise about 25 wt % to about 50 wt % water, based on the total weight of the ink or overprint varnish. For example, the inks and overprint varnishes of the invention may comprise water in an amount of about 25 wt % to about 45 wt %; or about 25 wt % to about 40 wt %; or about 25 wt % to about 35 wt %; or about 25 wt % to about 30 wt %; or about 30 wt % to about 50 wt %; or about 30 wt % to about 45 wt %; or about 30 wt % to about 40 wt %; or about 30 wt % to about 35 wt %; or about 35 wt % to about 50 wt %; or about 35 wt % to about 45 wt %; or about 35 wt % to about 40 wt %; or about 40 wt % to about 50 wt %; or about 40 wt % to about 45 wt %; or about 45 wt % to about 50 wt %.

The inks and overprint varnishes of the present invention optionally further comprise one or more colorants. Such colorants include pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitranilines, pyrazoles, diazopyranthrones, dinityanilines, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

When present, organic pigments and dyes are typically present in an amount of about 0.1% to about 7% (w/w), based on the total weight of the ink or overprint varnish. For example, the organic pigments and dyes may be present in an amount of 0.1% to 6.5%; or 0.1% to 6%; or 0.1% to 5.5%; or 0.1% to 5%; or 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 7%; or 0.5% to 6.5%; or 0.5% to 6%; or 0.5% to 5.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%; or 1% to 7%; or 1% to 6.5%; or 1% to 6%; or 1% to 5.5%; or 1% to 5%; or 1% to 4.5%; or 1% to 4%; or 1% to 3.5%; or 1% to 3%; or 1% to 2.5%; or 1% to 2%; or 1% to 1.5%.

When present, inorganic pigments are typically present in an amount of 1% to 40% (w/w), based on the total weight of the ink or overprint varnish. For example, the inorganic pigments may be present in an amount of 1% to 35%; or 1% to 30%; or 1% to 25%; or 1% to 20%; or 1% to 15%; or about 1% to about 10%; or about 1% to about 5%; or 5% to 40%; or 5% to 35%; or 5% to 30%; or 5% to 25%; or 5% to 20%; or 5% to 15%; or about 5% to about 10%; or about 10% to about 40% or 10% to 35%; or 10% to 30%; or 10% to 25%; or 10% to 20%; or 10% to 15%; or 15% to 40%; or 15% to 35%; or 15% to 30%; or 15% to 25%; or 15% to 20%; or 20% to 40%; or 20% to 35%; or 20% to 30%; or 20% to 25%.

The inks and overprint varnishes of the invention may optionally contain one or more other additives. Such additives include, but are not limited to, wetting aids, alcohols, polyethylene wax emulsions, wax dispersions, anti-foaming agents, ammonia, defoamers, dispersants, stabilizers, silicones, rheological modifiers, plasticizers, and the like.

Examples of such additives include isopropanol and n-propanol; polyethylene wax emulsions such as Munzing Lubraprint 2036 and Byk Aquacer 531; wax dispersions such as Munzing Lubraprint 499, Keim Ultralube D816 and Crayvallac WW1001; antifoams such as Byk 023 and Evonik Tegofoamex 1488; wetting aids such as Evonik TegoWet 500, Byk Dynwet 800 and Air Products Surfynol AD01; biocides such as WR-0268 from Thor Chemicals, and dispersants such as Byk Disperbyk 190.

When present, such additives are typically present in an amount of about 0.1 wt % to about 5 wt %, based on the total weight of the ink or overprint varnish composition. For example, the additives may be present in an amount of about 0.1 wt % to about 4.5 wt %; or about 0.1 wt % to about 4 wt %; or about 0.1 wt % to about 3.5 wt %; or about 0.1 wt % to about 3 wt %; or about 0.1 wt % to about 2.5 wt %; or about 0.1 wt % to about 2 wt %; or about 0.1 wt % to about 1.5 wt %; or about 0.1 wt % to about 1 wt %; or about 0.1 wt % to about 0.5 wt %; or about 0.5 wt % to about 5 wt %; or about 0.5 wt % to about 4.5 wt %; or about 0.5 wt % to about 4 wt %; or about 0.5 wt % to about 3.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %.

The inks and overprint varnishes of the present invention are preferably substantially free of bisphenol-A (BPA), and are advantageously preferably free of epoxy esters. BPA and epoxy esters are associated with toxicity. Furthermore, when the inks or overprint varnishes are applied to food or pharmaceutical packaging, any BPA and/or epoxy esters present may migrate into the product, causing contamination.

If present, the inks and overprint varnishes of the present invention contain less than or equal to 300 ppm BPA. For example, BPA may be present in an amount of less than 250 ppm; or less than 200 ppm; or less than 150 ppm; or less than 100 ppm. Advantageously, the inks and overprint varnishes of the present invention contain no BPA.

If present, the inks and overprint varnishes of the present invention contain less than or equal to 30 wt % epoxy esters, based on the total weight of the ink or overprint varnish composition. For example, the inks and overprint varnishes of the present invention may contain less than 25 wt %; or less than 20 wt %; or less than 15 wt %; or less than 10 wt %; or less than 5 wt %; or less than 1 wt % epoxy esters. Advantageously, the inks and overprint varnishes of the present invention contain no epoxy esters.

The inks and overprint varnishes of the present invention may be used for any type of printing, but they are advantageously gravure or flexographic printing inks or coating compositions. The inks and overprint varnishes of the present invention have been formulated preferably for use on shrinkable polymeric film substrates, and can also be used for non-shrinkable polymeric film substrates. The most common substrate used in the heat shrink process is polyethylene terephthalate (PET), but the inks and overprint varnishes of the present invention are suitable for other flexible polymeric films as well. Examples of other polymeric films include oriented polypropylene (OPP), polyvinylchloride (PVC), oriented polystyrene (OPS), and polylactic acid film (PLA). The polymeric films can, for example, be used for a wide range of shrinkable sleeve products. These shrink grade films typically activate at a temperature ranging between 55° C. and 65° C., and may shrink up to 75% across machine direction. It should be noted that the inks and overprint varnishes of the present invention are also suitable for use on films that activate outside the 55° C. to 65° C. range, or on films that do not heat activate at all.

The inks and overprint varnishes of the present invention are also preferably approved for indirect food contact status by regulatory agencies. It is preferred that all the materials used in the inks and overprint varnishes have been successfully tested for migration potential, and are approved under the Toxic Substances Control Act (TSCA) and by the Food and Drug Administration (FDA).

In one embodiment, the present invention is directed to water-based acrylic inks for printing onto heat shrinkable polymeric films which can be shrunk by hot water/steam, as opposed to prior art water-based inks that can only be shrunk by infrared radiation. The water-based inks of the present invention are preferably printed by flexography or gravure, but are not restricted to these two printing methods. The inks are similar to the ones listed in WO 2016/028850, but are specially formulated for flexographic or gravure printing, particularly on shrinkable polymeric film.

In another embodiment, the inks and overprint varnishes of the present invention can be used for milk/juice sachets made from clear non-shrinkable polymeric film. In most instances, the film is polypropylene, but other films can also be used, such as, for example, including, but not limited to, polyethylene film (PE), PET, as well as aluminum foil and various flexible laminate structures.

When the compositions are used as overprint varnishes, they are usually clear and non-pigmented. The overprint varnishes are used to protect prior printed inks, and provide increased abrasion resistance and chemical resistance. That is, the prior printed inks by themselves are prone to being rubbed off, removed by chemicals, or compromised by heat. The overprint varnish provides a protective layer that is rub and chemical resistant, and resistant to heat, so that the print remains undamaged.

The invention is further described by the examples below.

EXAMPLES

The following examples illustrate specific aspects of the present invention and are not intended to limit the scope thereof in any respect and should not be so construed.

Test Methods
Printing

Print samples were produced using wire wound K-bar (9 μm) onto various shrink film substrates, available typically from Gunze, Klockner, Pentaplast. The shrink film substrates used were PVC, polyesters, PET, glycol-modified polyesters, PETG, OPS, and polypropylene. Prints were dried under ambient conditions (25° C. and 50% relative humidity (RH)).

Hot Water Test

Inks were applied to a shrink film substrate (dimensions approximately 300 mm long and 150 mm wide), ensuring that the film shrank in the direction transverse to the print direction. The prints were half submerged into a water bath set to 95° C. for 15 minutes. The shrunken prints were removed from the water, flattened, and dried with a paper cloth. The adhesion, scratch resistance, and wrinkle resistance of the test prints was evaluated.

Tape Adhesion Test

Scotch 610 adhesive tape was applied to the print sample. The tape was pulled off manually, by a slow pull followed by a fast pull, in a direction perpendicular to the surface of the print. The tape was pulled off immediately after it had been applied. Adhesion was rated on a scale of 1 to 5, or 1 to 10, as indicated in each respective results table.

When adhesion was rated on a scale of 1 to 5, the scoring was as follows:
1=greater than 80% ink removal
2=60% to 80% ink removal
3=40% to 60% ink removal
4=10% to 40% ink removal
5=less than 10% ink removal When adhesion was rated on a scale of 1 to 10, the scoring was as follows:
1=greater than or equal to 90% ink removal
2=80% ink removal
3=70% ink removal
4=60% ink removal
5=50% ink removal
6=40% ink removal
7=30% ink removal
8=20% ink removal
9=10% ink removal
10=no ink removal Scratch Resistance A print sample was laid print side up on a hard surface, and the back of the index finger nail was scratched across the surface. The print was evaluated for the level of ink removal using the scale of 1 to 5 as described above in the adhesion test.

Wrinkle Test

The print sample was grasped with the thumb and forefinger at either side of the print, hands approximately 1 inch apart, and the print sample was rotated vigorously by twisting the ends in opposite directions, so that the printed side faced itself, for 50 cycles, to simulate repeated flexing of the print. The level of ink removal and/or damage to the print surface was evaluated on the scale of 1 to 5 as described above in the adhesion test.

Curl Test

Using a sharp knife, a cross-shaped incision was made into the print, approximately 5 cm long for each cut, and the amount of curl assessed. Curl was assessed on a scale of 1 to 5 as follows:
1=significant curl
2=moderate to significant curl
3=moderate curl
4=minimal to moderate curl
5=minimal curl Ambient Product Drop Test A drop of a liquid product (glucose or cola) was placed onto the print surface and left for 24 hours at room temperature. The product was then wiped off with a wet paper cloth, and assessed for print damage on a scale of 1 to 5 as described above in the adhesion test.

30° C. Product Drop Test

A drop of a liquid product (glucose or cola) was placed onto the print surface. The print was placed in an oven set at 30° C. for 24 hours. The product was then wiped off with a wet paper cloth, and assessed for print damage on a scale of 1 to 5 as described above in the adhesion test.

Product Immersion Test

A strip of print sample was submerged in a jar of a liquid product (glucose or cola) for 24 hours. The print sample was then taken out of the jar, and the product was removed by rinsing with water. The samples were assessed for damage on a scale of 1 to 5 as described above for tape adhesion.

Blocking

The print samples were placed in the Specac Blocking Tester face to face (A-A) or face to back (A-B), and a pressure of 10 MPa was applied at room temperature for 10 minutes. The samples were visually inspected to ensure no blocking, and rated on a scale of 1 to 5 or on a scale of 1 to 10, as indicated in each respective results table. Blocking is the transfer of ink from one substrate to the other substrate. Significant blocking means that greater than or equal to 90% of ink was transferred from one substrate to the other, while minimal blocking means that less than or equal to 10% of ink was transferred from one substrate to the other, and preferably no ink was transferred.

When rated on a scale of 1 to 5, scoring of blocking was as follows:
- 1=significant blocking
- 2=moderate to significant blocking
- 3=moderate blocking
- 4=minimal to moderate blocking
- 5=minimal blocking When rated on a scale of 1 to 10, scoring of blocking was as follows:
- 1=greater than or equal to 90% ink transfer
- 2=80% ink transfer
- 3=70% ink transfer
- 4=60% ink transfer
- 5=50% ink transfer
- 6=40% ink transfer
- 7=30% ink transfer
- 8=20% ink transfer
- 9=10% ink transfer
- 10=no ink transfer Fold Test The print sample was folded, and the crease rubbed repeatedly between the fingers for 20 seconds. The folded print was assessed for print damage on a scale of 1 to 5 as described above for the adhesion test.

Wet Rub Resistance

Prints were air-dried for 7 days. Using a Satra rub tester (Model STM 461), a felt pad (25 mm OD) soaked with a specified reagent (water, milk, juice, Saniglide line lubricant, hydrogen peroxide ($H_2O_2$), and was rotated on the surface of the print, at a load of 1.8 kg. The results are reported as number of rubs required for complete removal of the ink, a higher number being indicative of better rub resistance. When line lubricant and hydrogen peroxide were tested, the liquid was placed on the printed substrates for three minutes, followed by the rub test as described above.

Chilled Wet Rub Resistance

Dried prints were placed in a bucket of water and refrigerated for 16 to 24 hours. The prints were then tested using the Satra rub test with water as the test reagent.

Humid Wet Rub Test

Dried prints were stored at 50° C. and 30% relative humidity for 16 to 24 hours. The prints were then tested using the Satra rub test with water as the reagent.

Hand Wet Rub Test

Dried prints were grasped with thumb and forefinger at either side of the print, hands approximately 1 inch apart, and rotated vigorously for 50 cycles under running water, with the printed side face to face, to simulate repeated flexing of the print. The level of ink/varnish removal was assessed on a scale of 1 to 10 where a rating of 10 is excellent and 1 is poor, as follows:
- 1=greater than or equal to 90% ink removal
- 2=80% ink removal
- 3=70% ink removal
- 4=60% ink removal
- 5=50% ink removal
- 6=40% ink removal
- 7=30% ink removal
- 8=20% ink removal
- 9=10% ink removal
- 10=no ink removal Slip Test Davenport Coefficient of Friction Static and dynamic Coefficient of Friction (CoF) were assessed according to ASTM D1894, using a Davenport CoF tester.

Inks and/or overprint varnishes were printed onto PE/OPP/PET/PVC or OPS film substrate. Print samples at least about 254 cm long and 8 cm wide were prepared. One sample was affixed to the test bed with adhesive tape, ensuring that it was held flat, smooth, and unstretched. Another sample was affixed to the underside of the sled with adhesive tape, ensuring that the print surface was not touched. The cord was attached to the sled, and the sled was placed gently onto the left-hand end of the print on the test bed, so that it was positioned centrally between the two L-shaped marks, with its leading edge in line with the right-hand edge of the marks. A small amount of slackness was left in the cord. The machine was started, and the sled was pulled along the test bed at a speed of 15 cm/min. If measuring static CoF the digital display was immediately re-set to ensure that a false reading was not registered on start up. CoF was measured with the samples face to face (A-A) or face to back (A-B).

Static friction is the force that holds back a stationary object just up to the point that it begins to move. Thus, the static CoF relates to the force restricting the movement of an object that is stationary on a relatively smooth, flat surface. The static CoF was recorded as the final (maximum) reading on the digital display, or the highest recorded force at the beginning of the recorder trace.

Dynamic friction is the force holding back the regular motion of an object on a surface. Thus, the dynamic CoF is the average force required to keep the sled moving along the test bed. The reading from the CoF tester is the average of the readings to keep the sled moving (either average the highest and lowest readings; or obtain the average of the trace if using a digital recorder).

Static and dynamic CoF are calculated as follows:

CoF=(force in grams)/(weight of sled in grams)

Where force in grams=reading multiplied by 10 when sensitivity is set to $X1$, or multiplied by 2 when the sensitivity is set to $X5$.

Printability (Flexographic)

Printability was assessed on production prints. Prints were gauged for defects in either solid or tone areas. The assessment was done on a grey scale, where 10=excellent and 1=poor. Only prints that passed as commercially acceptable were deemed fit for the process of the present invention. The portion of the ink coverage that would not print onto the substrate was assessed (percent ink refusal). The rating scale was as follows:

1=poor—greater than or equal to 90% ink refusal
2=80% ink refusal
3=70% ink refusal
4=60% ink refusal
5=50% ink refusal
6=less than or equal 10% ink refusal—commercially acceptable
7=commercially acceptable—some defects possible
8=slight defect
9=very slight defect
10—excellent—no defects Wash-Up Wash-up is a measure of how easily inks can be cleaned off of equipment after a print run on a commercial press. Wash-up is assessed by the print crew, and wash-up is rated as either acceptable or unacceptable. Only inks which to do not cause any excess downtime to normal production are deemed acceptable.

Resolubility

Resolubility is a measure of how easily inks remain resoluble within themselves during a press run. If an ink is not resolubile enough in itself, print problems occur due to drying of ink residue on the press. Only inks which are resoluble enough not to cause excessive print problems are deemed acceptable.

Examples 1 and 2

Water-Based White Ink and Water-Based Cyan Ink

A water-based white ink, Example 1, was prepared for use in the process of the present invention. The formulation of Example 1 is shown in Table 1 below.

TABLE 1

Formulation of Example 1 white ink

| Material | White Ink | Typical Range |
|---|---|---|
| Neocryl XK14 Acrylic emulsion | 30.7 | 20-60 |
| Neocryl A1125 | 6.4 | 5-15 |
| Joncryl 8052 | 6.2 | 5-15 |
| Disperbyk 190 | 2.2 | 1-5 |
| Tego Foamex 1488 | 0.3 | 0.1-1.0 |
| WR-0268 Biocide | 0.2 | 0.1-1.0 |
| N-Propanol | 5.1 | 3-6 |
| Aquacer 531 | 5.6 | 2-12 |
| Surfynol AD01 | 3.3 | 1-5 |
| Urea | 0.9 | 0.5-5.0 |
| Mono propylene glycol | 1.4 | 0.5-5.0 |
| DC209S | 1.8 | 0.2-3.0 |
| Water | 3.8 | 2-10 |
| Titanium Dioxide Pigment | 32.1 | 15-50 |
| Total wt % | 100.0 | |

Neocryl XK14 acrylic emulsion is a self-crosslinking acrylic emulsion with a Tg of about 50° C.
Neocryl A1125 is a water-based self-crosslinking acrylic copolymer emulsion with a MFFT of less than 0° C.
Joncryl 8052 is an acrylic emulsion with a Tg of −35° C.
Disperbyk 190 is a styrene block copolymer wetting aid.
Tego Foamex is a polyether siloxane copolymer emulsion defoamer.
Aquacer 531 is a modified PE wax emulsion in water.
Surfynol AD01 is a non-ionic surfactant based on Gemini technology.
DC209S is a silicone emulsion in water.

A water-based cyan ink, Example 2, was prepared for use in the process of the present invention. The formulation of Example 2 is shown in Table 2 below. Note that although water is not listed as a separate component, the composition contains water because the acrylic emulsions, wax emulsions, and silicone emulsions contain water.

TABLE 2

Formulation of Example 2 cyan ink

| Material | Cyan Ink | Typical Range |
|---|---|---|
| Neocryl XK14 Acrylic emulsion | 42.5 | 20-60 |
| Joncryl ECO2124 | 8.1 | 5-15 |
| N-Propanol | 3.4 | 1-5 |
| Aquacer 531 | 7.5 | 2-12 |
| Crayvallac WW1001 | 6.0 | 2-10 |
| Tego Foamex 1488 | 0.3 | 0.1-1.0 |
| Mono propylene glycol | 1.5 | 0.5-5.0 |
| Urea | 0.9 | 0.5-5.0 |
| Surfynol AD01 | 3.3 | 1-5 |
| DC209S | 1.5 | 0.2-3.0 |
| Pigment Dispersion (50/50 Cyan and Violet - Blue) | 25.0 | 5-50 |
| Total wt % | 100.0 | |

Joncryl ECO2124 is a glycol ether free acrylic emulsion with a Tg of −35° C.
Crayvallac WW1001 is a PE wax dispersion in water.

Comparative Examples 1A (white) and 2A (cyan) were prepared identically to Examples 1 and 2, except that the NeoCryl XK14 self-crosslinking acrylic emulsion (with a Tg greater than 0° C.) was replaced with Wallpol 01B self-crosslinking acrylic emulsion (with a Tg less than 0° C.). Comparative Examples 1B (white) and 2B (cyan) are commercially available solvent-based Sleeve Flex inks from Sun Chemical.

The test ink samples were reduced to printing viscosity (19 second Zahn #2 cup) with water. Examples 1 and 2, and comparative Examples 1A and 2A, were printed onto 50 μm PET shrink film, and tested as described above. The results are shown in Tables 3 to 8. The basic initial tests, product drop tests, product tests, curl tests, and blocking tests were performed prior to shrinking. The results for the hot water test are after shrinking in the hot water.

TABLE 3

Basic initial tests

| Print | Tape adhesion | Scratch | Wrinkle | Fold |
|---|---|---|---|---|
| Ex. 1 only | 5 | 5 | 4 | 5 |
| Ex. 1 + Ex. 2 | 5 | 5 | 4 | 5 |
| Ex. 1A only | 4 | 5 | 4 | 5 |
| Ex. 1A + Ex. 2A | 4 | 5 | 4 | 3 |
| Ex. 1B only | 5 | 5 | 4 | 5 |
| Ex. 2B + Ex. 2B | 4 | 5 | 3 | 5 |

TABLE 4

Ambient product drop test

| Print | Glucose | Cola |
|---|---|---|
| Ex. 1 only | 5 | 5 |
| Ex. 1 + Ex. 2 | 5 | 5 |
| Ex. 1A only | 3 | 3 |
| Ex. 1A + Ex. 2A | 5 | 5 |
| Ex. 1B only | 5 | 5 |
| Ex. 1B + Ex. 2B | 5 | 5 |

TABLE 5

30° C. product drop test

| Print | Glucose | Cola |
|---|---|---|
| Ex. 1 only | 5 | 5 |
| Ex. 1 + Ex. 2 | 5 | 5 |
| Ex. 1A only | 3 | 3 |
| Ex. 1A + Ex. 2A | 5 | 5 |
| Ex. 1B only | 5 | 5 |
| Ex. 1B + Ex. 2B | 5 | 5 |

TABLE 6

Product immersion test

| Print | Glucose | Cola |
|---|---|---|
| Ex. 1 only | 5 | 5 |
| Ex. 1 + Ex. 2 | 5 | 5 |
| Ex. 1A only | 3 | 3 |
| Ex. 1A + Ex. 2A | 5 | 5 |
| Ex. 1B only | 5 | 5 |
| Ex. 1B + Ex. 2B | 5 | 5 |

TABLE 7

Hot water test

| Print | Tape adhesion | Scratch | Wrinkle |
|---|---|---|---|
| Ex. 1 only | 5 | 5 | 4 |
| Ex. 1 + Ex. 2 | 4 | 4 | 4 |
| Ex. 1A only | 2 | 1 | 1 |
| Ex. 1A + Ex. 2A | 2 | 1 | 1 |
| Ex. 1B only | 5 | 5 | 4 |
| Ex. 1B + Ex. 2B | 4 | 4 | 3 |

TABLE 8

Curl test and blocking test

| Print | Curl | Blocking |
|---|---|---|
| Ex. 1 only | 4 | 5 |
| Ex. 1 + Ex. 2 | 4 | 5 |
| Ex. 1A only | 4 | 2 |
| Ex. 1A + Ex. 2A | 4 | 2 |
| Ex. 1B only | 2 | 5 |
| Ex. 1B + Ex. 2B | 2 | 5 |

Example 3

Water-Based Overprint Varnish

An overprint varnish of the invention was prepared according to the formula in Table 9.

TABLE 9

Formulation of overprint varnish

| Material | Example 3 (OPV) |
|---|---|
| Neocryl XK14 Acrylic emulsion | 61.0 |
| Joncryl 8052 | 12.2 |
| N-Propanol | 4.5 |
| Aquacer 531 | 10.0 |
| Crayvallac WW1001 | 8.0 |
| Tego Foamex 1488 | 0.3 |
| Dynwet 800 | 2.0 |
| DC209S | 2.0 |
| Total | 100.00 |

Commercially available comparative inks, Aquathene CB red/blue carrier bag inks (Sun Chemical) were printed on various substrates: PE, PET, and PP. The overprint varnish of the present invention was then applied over the comparative inks. Separate prints of the comparative inks on PE, without the overprint varnish, were also prepared. As noted above, the present invention is the surprising discovery that inks prepared as in WO 2016/028850 are suitable for printing on shrinkable polymeric flexible film substrates. It was believed that these inks were only suitable for polyethylene coated board substrates. Ink 1 (Red) and Ink 2 (Blue) (from Table 1 of WO 2016/028850) were printed onto PE substrates, and the results surprisingly show that the Satra rub resistance is comparable to the overprint varnish of the present invention. The Satra rub resistance results for the prints are shown in Table 10. Results are reported as the number of rubs required for complete ink removal, with a higher number of rubs indicating better rub resistance. Note that the results are the average of the red and blue ink samples.

TABLE 10

Satra rub resistance

| Coating or Ink/Substrate | Water | Milk | Juice | Saniglide Line lube | $H_2O_2$ | Chilled Wet Rub (Immersed) | Humid wet rub |
|---|---|---|---|---|---|---|---|
| [1]Comparative Aquathene CB Red/Blue carrier bag ink/on PE | 30 | 10 | 5 | 1 | 1 | 2 | 2 |
| [2]Example 3 OPV/on PE | 100 | 40 | 100 | 40 | 15 | 30 | 30 |
| [2]Example 3 OPV/on PET | 70 | 30 | 50 | 25 | 25 | 25 | 30 |
| [2]Example 3 OPV/on cast PP | 80 | 40 | 60 | 20 | 15 | 10 | 20 |

TABLE 10-continued

Satra rub resistance

| Coating or Ink/Substrate | Water | Milk | Juice | Saniglide Line lube | $H_2O_2$ | Chilled Wet Rub (Immersed) | Humid wet rub |
|---|---|---|---|---|---|---|---|
| [3]Ink 1 (Red - Table 1) from WO2016028850/on PE | 100 | 60 | 40 | 15 | 15 | 30 | 30 |
| [3]Ink 2 (Blue - Table 1) from WO2016028850/on PE | 80 | 50 | 50 | 25 | 25 | 35 | 40 |

[1]Separate prints of both Aquathene CB Red and Blue (comparative inks) were prepared. The results in Table 10 are an average of the two prints.
[2]Because this is a visual test and the OPV is clear (colorless), red and blue inks with inferior resistance properties were first printed onto the substrate, and the OPV was applied in order to obtain an accurate result. These inferior resistance red and blue inks used are commercially available Aquathene CB (Sun Chemical) for use on polyethylene carrier bags. First, separate prints of both Aquathene CB Red and Blue were prepared on the specified polymeric substrate in Table 10, and then subsequently overprinted with the Example 3 OPV. The results in Table 10 show that the OPV of the present invention provides excellent resistance properties to inks that have relatively poor resistance properties without the Example 3 OPV. The OPV results in Table 10 are an average of the red and blue inks. For comparative purposes, the rubs for the Aquathene CB carrier bag red/blue inks (without OPV) are also shown in Table 10. These results show that the resistance properties come from the OPV.
[3]Red and blue inks were prepared using the formulae from Table 1 in WO 2016/028850 and subsequently separately printed and dried, and tested for rub resistance. The results show that the inks based on these formulae and printed according to the inventive process of the present invention onto shrinkable polymeric substrates are far superior to the Aquathene inks that were not overprinted.

The physical properties of the Example 3 OPV and the Sun Inks exemplified in WO 2016/028850 were tested. The results are based on an average of two prints (one red, one blue) printed onto PE substrate. Results are shown in Table 11.

TABLE 11

Physical properties

| Other Testing | [2]Example 3 Inventive OPV | [3]Inks in WO2016028850 |
|---|---|---|
| Adhesion Tape Test | 100% | 100% |
| Scratch Resistance* | 10 | 10 |
| Resolubility | Acceptable | Acceptable |
| Wash-up | Acceptable | Acceptable |
| Printability, Flexo* | 9 | 10 |
| Gloss (60° C.) - 7days | 45.0 | [3]Ink 1 Red - 46.0; Ink 2 Blue - 40.0 |
| [1]Static Slip - Face to back - 16 days | 0.23 | 0.25 |
| [1]Dynamic Slip - Face to back - 16 days | 0.21 | 0.23 |
| [1]Static Slip - Face to face - 16 days | 0.27 | 0.29 |
| [1]Dynamic Slip - Face to face - 16 days | 0.18 | 0.20 |
| Blocking* - Face to Face - 16 days | 10 | 10 |
| Blocking* - Face to Back - 16 days | 10 | 10 |
| Hand Wet Rub Test* | 10 | 10 |

The results confirm that the OPV of the present invention achieves the same improvements in resistance as the inks of the present invention and WO 2016/028850.

In general, the results show that the inks and overprint varnishes of the present invention are suitable for shrinkable flexible polymeric film substrates (also non-shrinkable polymeric film substrates). The inks and overprint varnishes of the present invention exhibit superior properties compared to commercially available inks.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A process for printing on a polymeric substrate, comprising:
    a) providing an ink or coating composition comprising:
        i) at least one self-crosslinking acrylic polymer;
        ii) at least one coalescent;
        iii) at least one silicone emulsion, wherein the silicone is a polydimethylsiloxane having reactive silanol groups; and
        iv) water;
    wherein the self-crosslinking acrylic polymer has a glass transition temperature of greater than 0° C.;
    b) applying the ink or coating composition of a) to a polymeric substrate; and
    c) drying the ink or coating composition on the polymeric substrate.

2. The process of claim 1, wherein the polymeric substrate is selected from oriented polypropylene, polyvinylchloride, oriented polystyrene, polyethylene terephthalate, and polylactic acid film.

3. The process of claim 1, wherein the self-crosslinking acrylic polymer of the ink or coating composition has a glass transition temperature of between 20° C. and 70° C.

4. The process of claim 1, wherein the self-crosslinking acrylic polymer of the ink or coating composition is a styrene/acrylic ester copolymer.

5. The process of claim 1, wherein the self-crosslinking acrylic polymer of the ink or coating composition is an acrylic emulsion.

6. The process of claim 1, wherein the coalescent has a glass transition temperature of less than or equal to 20° C.

7. The process of claim 1, wherein the coalescent of the self-crosslinking acrylic polymer is an acrylic emulsion.

8. The process of claim 1, wherein the ink or coating composition comprises between 5 wt % and 60 wt % self-crosslinking acrylic emulsion, based on the total weight of the ink or coating composition.

9. The process of claim 1, wherein the ink or coating composition comprises between 30 wt % to 50 wt % self-crosslinking acrylic polymer, based on the total weight of the ink or coating composition.

10. The process of claim 1, wherein the ink or coating composition comprises between 2 wt % to 20 wt % coalescent, based on the total weight of the ink or coating composition.

11. The process of claim 1, wherein the ink or coating composition comprises between 0.2 wt % to 3 wt % silicone emulsion, based on the total weight of the ink or coating composition.

12. The process of claim 1, wherein the ink or coating composition further comprises a colorant.

13. The process of claim 1, wherein the ink or coating composition further comprises a pigment dispersion.

14. The process of claim 1, wherein the ink or coating composition is an overprint varnish.

15. The process of claim 14, wherein the overprint varnish is applied directly onto the substrate.

16. The process of claim 14, wherein the overprint varnish is applied over one or more first down inks and/or coatings.

17. The process of claim 1, wherein the ink or coating composition is a gravure or flexographic printing ink or coating composition.

18. The process of claim 1, wherein the ink or coating composition contains less than or equal to 300 ppm bisphenol-A (BPA).

19. The process of claim 1, wherein the ink or coating composition contains less than or equal to 30 wt % epoxy esters.

20. The process of claim 1, wherein the ink or coating composition contains no epoxy esters.

\* \* \* \* \*